US012714891B2

(12) United States Patent
Hrouzek et al.

(10) Patent No.: US 12,714,891 B2
(45) Date of Patent: Aug. 25, 2026

(54) ABSORBER ASSEMBLIES, FALL PROTECTION SYSTEMS, AND METHODS OF USE

(71) Applicant: Honeywell Safety Products USA, Inc., Charlotte, NC (US)

(72) Inventors: Jan Hrouzek, Brno (CZ); Václav Hrůza, Brno (CZ); Tanguy Prévot, Nebovidy (CZ)

(73) Assignee: Honeywell Safety Products USA, Inc., Latham, NY (US)

( * ) Notice: Subject to any disclaimer, the term of this patent is extended or adjusted under 35 U.S.C. 154(b) by 184 days.

(21) Appl. No.: 18/446,071

(22) Filed: Aug. 8, 2023

(65) Prior Publication Data

US 2025/0050143 A1 Feb. 13, 2025

(51) Int. Cl.
*A62B 35/04* (2006.01)
*A62B 35/00* (2006.01)

(52) U.S. Cl.
CPC .......... *A62B 35/04* (2013.01); *A62B 35/0068* (2013.01)

(58) Field of Classification Search
CPC . A62B 35/04; A62B 35/0068; A62B 35/0037; A62B 35/005; A62B 35/0081
USPC .......................................................... 248/636
See application file for complete search history.

(56) References Cited

U.S. PATENT DOCUMENTS 8,550,225 B2 * 10/2013 Blomberg ............... F16F 7/128 188/371
10,710,531 B2 * 7/2020 Abushawashi ......... B60R 19/42
11,406,851 B2 * 8/2022 Novotny .................. A62B 1/14
11,577,105 B2 * 2/2023 Marak ................ A62B 35/0037
11,642,554 B2 * 5/2023 Sulc .................. A62B 35/0081 188/65.1

(Continued)

FOREIGN PATENT DOCUMENTS

AU 2021273524 A1 6/2022
EP 3550176 A1 10/2019

(Continued)

OTHER PUBLICATIONS

Extended European Search Report Mailed on Dec. 23, 2024 for EP Application No. 24185730, 8 page(s).

(Continued)

*Primary Examiner* — Muhammad Ijaz
(74) *Attorney, Agent, or Firm* — Fredrikson & Byron, P.A.

(57) ABSTRACT

Methods, systems, assemblies, and/or the like are provided. According to various embodiments, there is provided an absorber assembly including: an absorber body configured to deform under one or more loading forces; a load lock comprising a first counter face and a second counter face, wherein the load lock is configured to prevent deformation of the absorber body when the one or more loading forces are below a minimal threshold; a primary absorbing part configured to deform the absorber body such that the absorber body does not exceed a primary threshold; and a secondary absorbing part configured to deform the absorber body such that the absorber body does not exceed a secondary threshold. In some embodiments, the absorber assembly includes a line of deformation ("LOD") disposed on or within the absorber body, wherein the LOD comprises one or more radii.

10 Claims, 12 Drawing Sheets

(56) References Cited

U.S. PATENT DOCUMENTS

| | | | | |
|---|---|---|---|---|
| 2005/0205356 | A1* | 9/2005 | Velasco | A62B 35/0037 182/3 |
| 2009/0133977 | A1* | 5/2009 | Warren | F16F 7/003 188/371 |
| 2013/0277519 | A1* | 10/2013 | Poldmaa | A62B 1/04 248/237 |
| 2014/0020983 | A1* | 1/2014 | Casebolt | A62B 35/0081 182/241 |
| 2021/0128955 | A1* | 5/2021 | Marak | A62B 35/0081 |
| 2021/0299490 | A1 | 9/2021 | Sulc et al. | |
| 2023/0158348 | A1* | 5/2023 | Faber | A62B 35/0081 188/65.1 |
| 2023/0226388 | A1* | 7/2023 | Song | A62B 1/14 182/231 |
| 2023/0233889 | A1* | 7/2023 | Sulc | F16D 63/008 188/65.1 |
| 2023/0241430 | A1* | 8/2023 | Emonin | A62B 35/0037 182/3 |
| 2023/0381556 | A1* | 11/2023 | Hrouzek | A62B 35/0081 |
| 2024/0366977 | A1* | 11/2024 | Hrouzek | A62B 35/005 |
| 2024/0424326 | A1* | 12/2024 | Hrouzek | A62B 35/0062 |
| 2024/0426175 | A1* | 12/2024 | Hrouzek | A62B 1/04 |
| 2025/0050143 | A1* | 2/2025 | Hrouzek | A62B 35/04 |

FOREIGN PATENT DOCUMENTS

| | | |
|---|---|---|
| EP | 2470733 B1 | 8/2020 |
| EP | 3815748 A1 | 5/2021 |

OTHER PUBLICATIONS

Honeywell, “Anchorage Systems (Söll),” 2 pages, (2023). [Retrieved from the Internet Sep. 21, 2023: URL: <https://sps.honeywell.com/gb/en/products/safety/fall-protection/anchorage-systems>].

* cited by examiner

ABSORBER ASSEMBLIES, FALL PROTECTION SYSTEMS, AND METHODS OF USE

TECHNICAL FIELD

The present disclosure relates generally to absorber assemblies. In particular, it relates to absorber assemblies having one or more states of deformation.

BACKGROUND

Fall protection systems may be used to help protect technicians and/or their equipment when the technicians are operating on ladders, rails, ropes or other devices at high altitudes. Fall protection systems may include a shuttle attached to a harness worn by the technician and an absorber configured to deform when subject to one or more loading forces and subsequently lock the shuttle in place. An absorber may have a deformed state and an undeformed state and may transition to the deformed state when subject to the one or more loading forces. Once an absorber has been deformed it may not be possible or feasible to return the absorber to its original shape, and the absorber may need to be replaced.

Through applied effort, ingenuity, and innovation, Applicant has solved problems relating to absorber assemblies by developing solutions embodied in the present disclosure, which are described in detail below.

SUMMARY

In general, embodiments of the present disclosure provide systems, assemblies, methods and/or the like.

In accordance with various embodiments of the present disclosure, there is provided an absorber assembly including an absorber body configured to deform under one or more loading forces; a load lock comprising a first counter face and a second counter face, wherein the load lock is configured to prevent deformation of the absorber body when the one or more loading forces are below a minimal threshold; a primary absorbing part configured to deform the absorber body such that the absorber body does not exceed a primary threshold; and a secondary absorbing part configured to deform the absorber body such that the absorber body does not exceed a secondary threshold.

In some embodiments, the assembly further includes a line of deformation ("LOD") disposed on or within the absorber body, wherein the LOD comprises one or more radii, and wherein the absorber body is configured to deform along the LOD.

In some embodiments, the assembly further includes one or more additional cross-sectional areas disposed on or in the absorber body.

In some embodiments, the absorber body includes a nose portion configured to operably engage with one or more notches disposed on or within a rail.

In some embodiments, the one or more additional cross-sectional areas cross sections are disposed on or within the absorber body.

In some embodiments, the minimal threshold is greater than or equal to 2 kilo-Newtons.

In some embodiments, the primary threshold is less than or equal to 6 kilo-Newtons.

In some embodiments, the secondary threshold is less than or equal to 8 kilo-Newtons.

In some embodiments, the assembly further includes an attachment mechanism attached to the absorber body.

In accordance with various embodiments, there is provided a fall protection system including an absorber assembly including an absorber body configured to deform under one or more loading forces; a load lock comprising a first counter face and a second counter face, wherein the load lock is configured to prevent deformation of the absorber body when the one or more loading forces are below a minimal threshold; a primary absorbing part configured to deform the absorber body such that the absorber body does not exceed a primary threshold; and a secondary absorbing part configured to deform the absorber body such that the absorber body does not exceed a secondary threshold; and an attachment mechanism fixedly attached to the absorber body and configured to secure a user to a rail.

In some embodiments, the fall protection system includes a line of deformation ("LOD") disposed on or within the absorber body, wherein the LOD comprises one or more radii, and wherein the absorber body is configured to deform along the LOD.

In some embodiments, the fall protection system further includes one or more additional cross-sectional areas disposed on or in the absorber body.

In some embodiments, the absorber body includes a nose portion configured to operably engage with one or more notches disposed on or within a rail.

In some embodiments, the one or more additional cross-sectional areas cross sections are disposed on or within the absorber body.

In some embodiments, the attachment mechanism is a carabiner.

A method of using an absorber assembly, the method including absorbing, by an absorber body, one or more loading forces; deforming, by the one or more loading forces, a load lock when the one or more loading forces exceed a minimal threshold; deforming, by the one or more loading forces, a primary part when the one or more loading forces exceed a primary threshold; and deforming, by the one or more loading forces, a secondary part when the one or more loading forces exceed a secondary threshold.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1A:
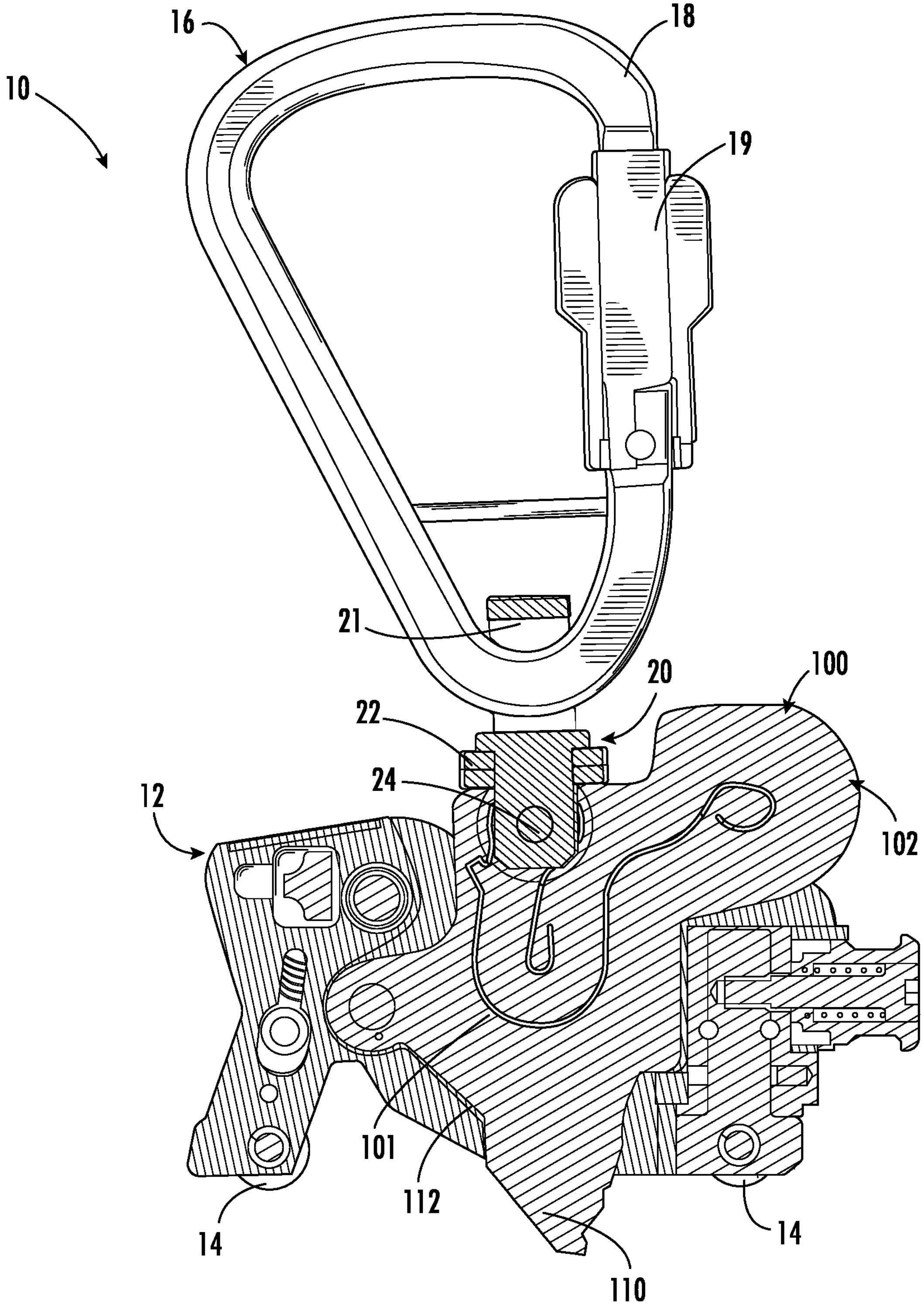
FIG. 1A shows a side, cross-sectional view of an example fall protection system in accordance with various embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, there is provided an absorber assembly configured to deform when undergoing one or more loading forces. Depending on amount of the one or more loading forces, the absorber assembly may deform to different extents. For example, greater loading forces may cause greater deformation and/or deformation of different components of the absorber assembly. Different components may prevent deformation if the loading forces do not exceed certain thresholds. In some embodiments, the absorber assembly may be integrated with a fall protection system. The absorber assembly may include one or more components intended to "stagger" the deformation of the absorber assembly as the absorber assembly undergoes the one or more loading forces.

In some embodiments, the absorber assembly may include an absorber body having a minimal load lock with counter faces configured to keep the absorber body from deforming when the one or more loading forces are below a minimal threshold. If this threshold is exceeded, in some embodiments, the absorber assembly may include a primary absorbing part and a secondary absorbing part configured to limit the impact force transferred to a user of the fall protection system, with the primary absorbing part configured to deform once the one or more loading forces exceed a primary threshold and the second absorbing part configured to deform once the one or more loading forces exceed a secondary threshold.

In some embodiments, the absorber body of the absorber assembly may include a line of deformation ("LOD"), or cut shape, that my include one or more radii. The absorber body may be configured to deform along the LOD. In some embodiments, the one or more radii may be optimized to prevent cracking or splitting of the absorber body during deformation. In some embodiments, additional cross-sectional material may be included in the absorber body at one or more locations to reinforce the absorber body.

Example Fall Protection Systems and Absorber Assemblies

FIG. 1A shows an elevated, side, cross-sectional view of an example fall protection system 10 (also known as an anchorage system), according to some embodiments. The fall protection system 10 may be attached to a rope, rail, ladder, and/or the like, as well as to a technician (e.g., by a harness, belt, and/or the like) may be climbing at some altitude to perform one or more tasks (e.g., maintenance, construction, repair, and/or the like). The fall protection system 10 may use various mountings and/or fixings, as will be described, to secure the technician to the aforementioned structures. For example, a shuttle car 12 having one or more wheels 14. The fall protection system 10 may be configured to provide safety to the technician in the event of a fall or slip by the technician.

In some embodiments, the fall protection system 10 may include a shuttle 12 configured to operably connect the fall protection system 10 to a rail or similar structure. Shuttle 12 may be a substantially rigid cart. In some embodiments, the shuttle 12 may include one or more wheels 14 configured to slidably translate the shuttle (and, by extension, the fall protection system 10) along the rail.

In some embodiments, the fall protection system 10 may include an attachment mechanism 16. The attachment mechanism 16 may be a carabiner. In some embodiments the attachment mechanism 16 may include a primary loop 18 configure to secure the fall protection system 10 to the technician (e.g., via a harness, belt loop, and/or the like). In some embodiments the attachment mechanism may include a latching mechanism 19. The latching mechanism 19 may be configured to selectively open and/or close the primary loop 18 (thereby selectively attaching the fall protection system 10 to the harness, belt loop, or similar structure). The latching mechanism 19 may be opened to detach the attachment mechanism 16 from the harness, belt loop, and/or the like.

In some embodiments, the fall protection system 10 may include a connector 20 configured to attach one or more components of the fall protection system 10. In some embodiments, the connector 20 may include a secondary loop 21 that may be interlinked with the primary loop 18 of the attachment mechanism 16. In some embodiments, the connector 20 may be operably engaged to the attachment mechanism 16. In some embodiments the connector 20 may include a swivel base 22. The swivel base 22 may be configured to pivot relative to the attachment mechanism 16. In some embodiments, the connector 20 may be secured to another component of the fall protection system by a fastener 24.

Figure 1B:
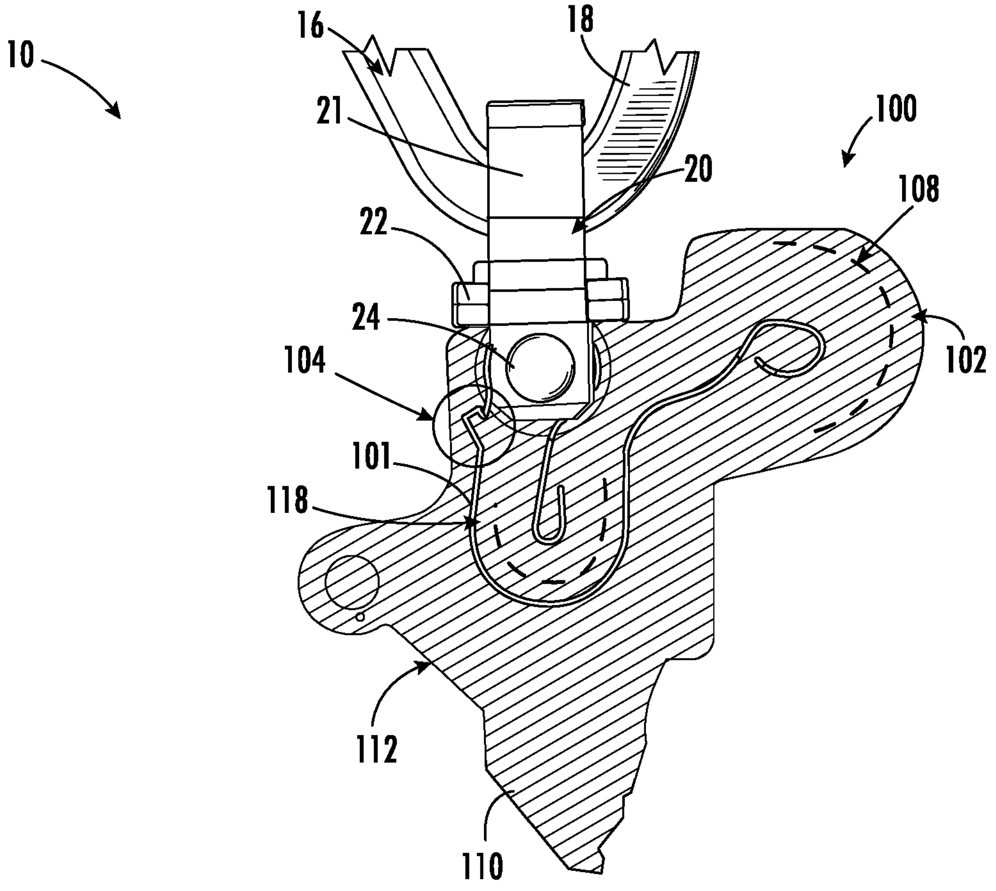
FIG. 1B shows a side, plan view of an example fall protection system in accordance with various embodiments of the present disclosure.

In some embodiments, the fall protection system 10 may include an absorber assembly 100. A side view of an example absorber assembly 100 is shown in at least FIG. 1B. The absorber assembly 100 may include an absorber body 102. In some embodiments, the absorber body 102 may be configured to deform under one or more loading forces. Loading forces may be sustained by the absorber assembly 100 (and, by extension, the fall protection system 10) during the event of a fall or slip by a technician using the fall protection system 10. The one or more loading forces may be absorbed by the absorber body 102 and subsequently cause deformation of the absorber body 102. The absorber assembly 100 may be connected to the attachment mechanism 16 by the connector 20.

Figure 2A:
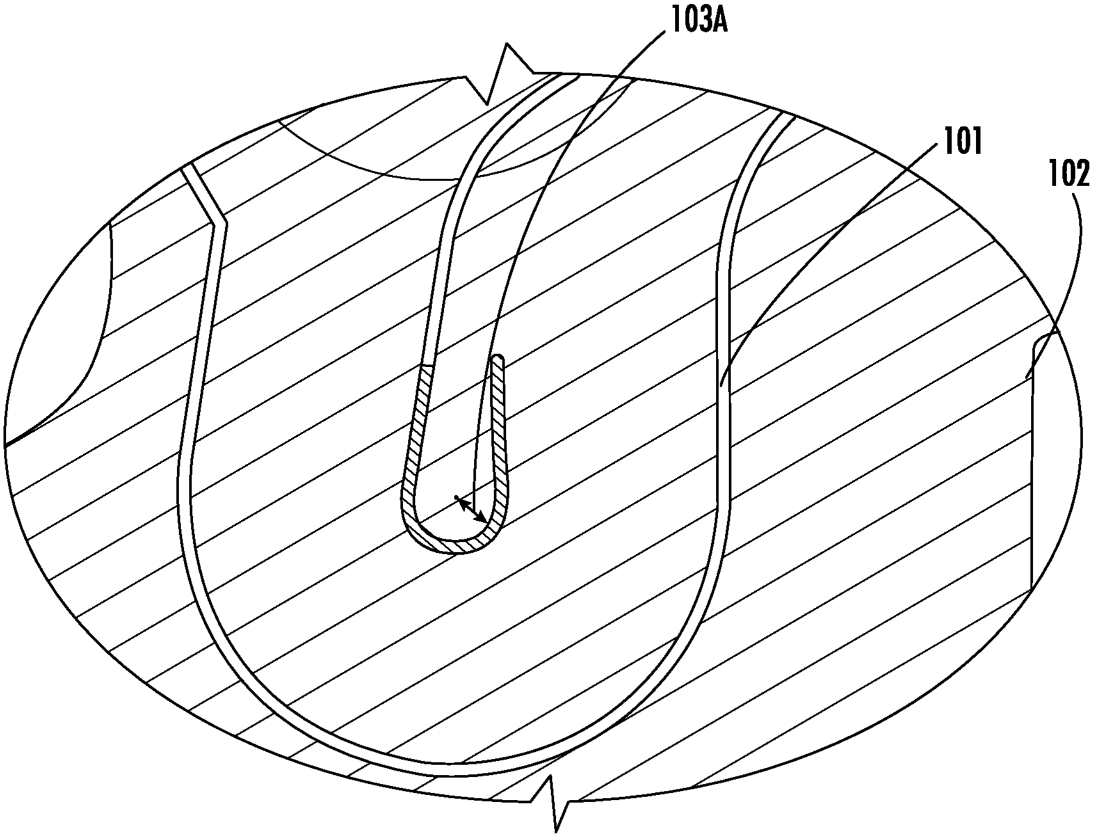
FIG. 2A shows a first detail view of an example fall protection system in accordance with various embodiments of the present disclosure.
Figure 2B:
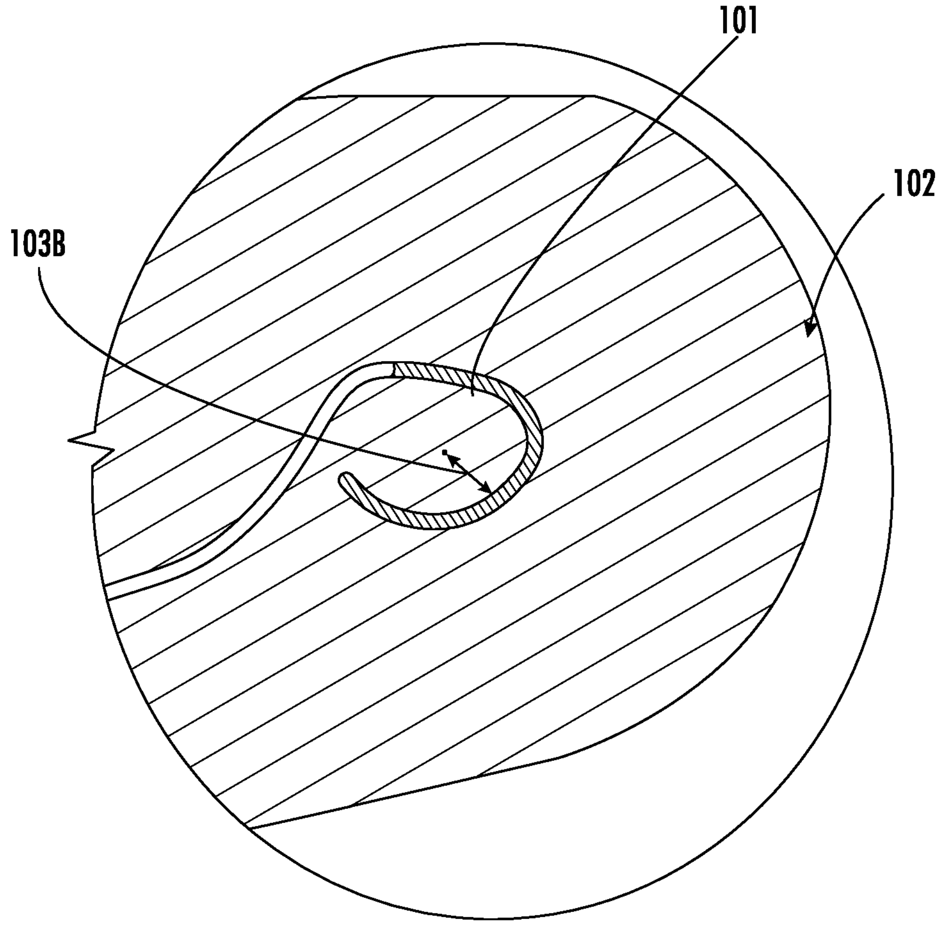
FIG. 2B shows a second detail view of an example fall protection system in accordance with various embodiments of the present disclosure.

In some embodiments, the absorber body 102 may include a line of deformation ("LOD") 101. The LOD 101 may be defined on or within the absorber body 102. When the absorber body 102 deforms, it may be configured to deform along the LOD 101, according to some embodiments. In some embodiments, the LOD 101 may be a curve defining one or more radii. As shown in FIGS. 2A and 2B, the LOD 101 may define a first radius 103A and a second radius 103B. In some embodiments, the LOD 101 may be curved throughout the absorber body 102 to reduce the potential for the absorber body 102 to crack or otherwise fracture. Similarly, the radii 103A, 103B may be optimized to avoid fracturing. Optimized radii 103A, 103B may be as large as possible along the LOD 101. The length of the radii 103A, 103B may be increased to prolong the LOD 101.

In some embodiments, the absorber body 102 may include or define one or more portions, including a nose portion 110. In some embodiments, the nose portion 110 may be configured to engage with a rail or other structure to which the shuttle 12 is attached. The nose portion 110 may be configured to operably engage with the rail when the fall protection system 10 undergoes one or more loading forces. In some embodiments, the nose portion 110 may be configured to engage with one or more notches and/or the like on or within the rail, hooking into the rail and thereby slowing or stopping a fall of a user of the fall protection system 10.

In some embodiments, additional cross-sectional area 112 may be disposed on or within the absorber body 102. The additional cross-sectional area 112 may be disposed at various points on the absorber body and/or concentrated in a single location or region of the observer body 102. The additional cross-sectional area 112 may reduce deformation of the absorber body 102 when the absorber body 102 undergoes one or more loading forces.

In some embodiments, the absorber assembly 100 may include a load lock 104. The load lock 104 may be configured to prevent the absorber body 102 from deforming under one or more loading forces when the one or more loading forces are below one or more thresholds. The load lock 104 may be a minimal load lock. In some embodiments, the load lock 104 may be disposed on or within the absorber body 102.

Figure 3:
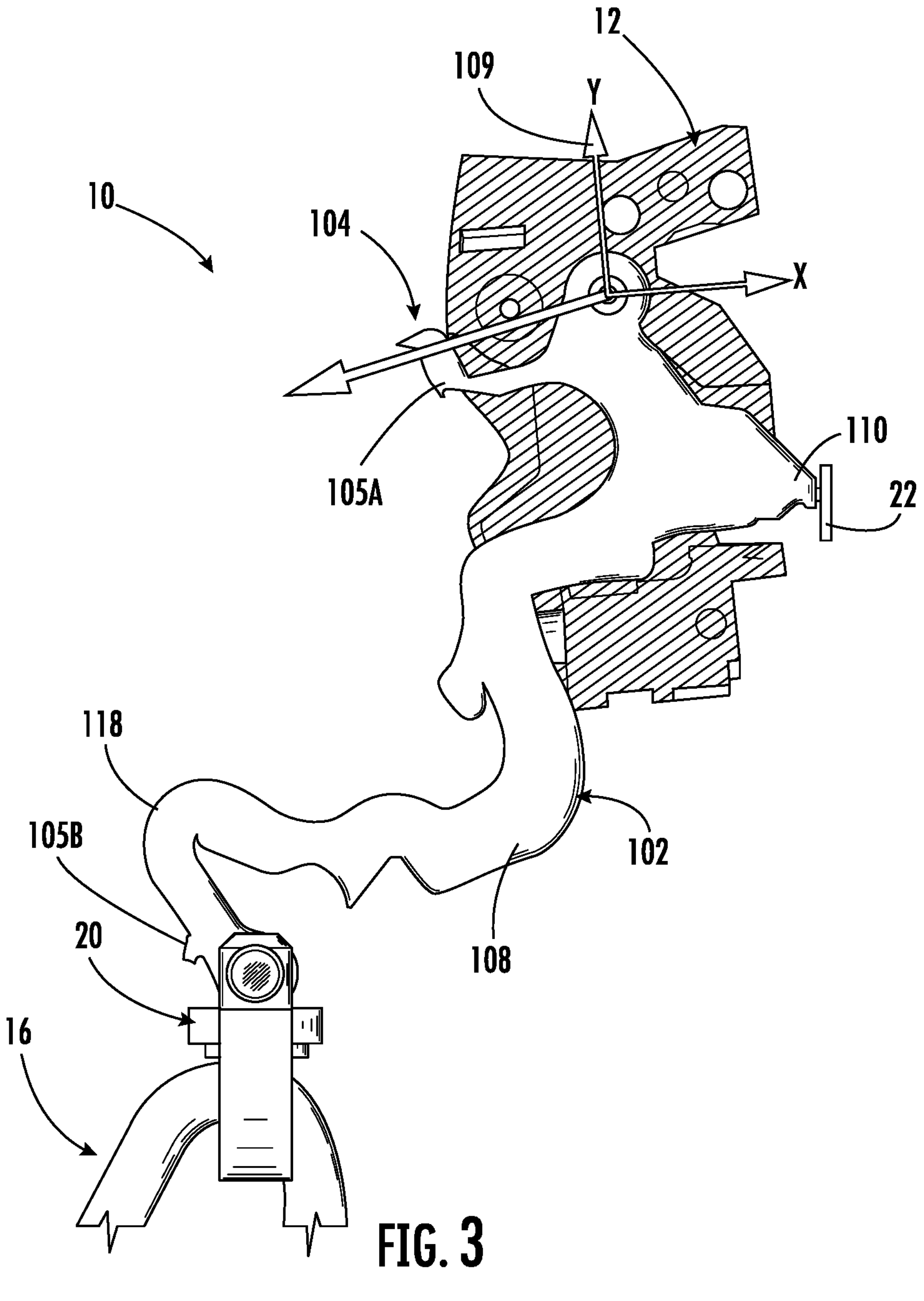
FIG. 3 shows a side, cross-sectional view of an example fall protection system in accordance with various embodiments of the present disclosure.

Referring now to FIG. 3, a fall protection system 10 is experiencing one or more loading forces, represented by the force diagram 109. As shown, the absorber body 102 has been deformed along the LOD 101. Further, as will be shown and described later in the disclosure, the absorber body 102 has deformed in stages based on the amount of loading force and the absorber body's 102 threshold's for deformation. Additionally, the nose portion 110 has operably engaged with a structure 22, which may be a part of a rail along which the shuttle 12 was travelling.

Figure 4A:
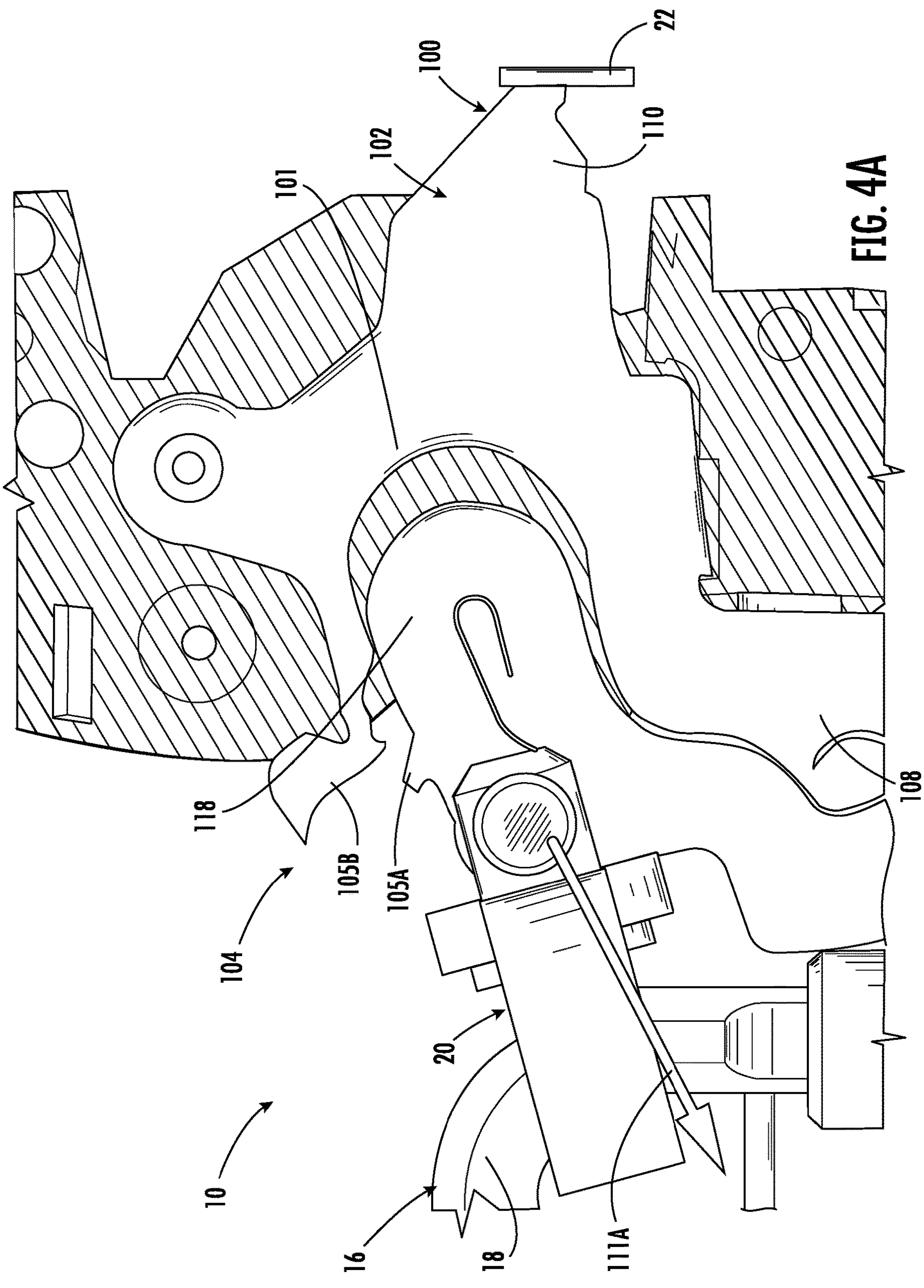
FIG. 4A shows a side, cross-sectional, detail view of an example fall protection system in accordance with various embodiments of the present disclosure.

In some embodiments, and as shown in at least FIG. 4A, the load lock 104 may include a first counter face 105A and a second counter face 105B. The first and second counter faces 105A, 105B may be configured to interlock with each other to prevent, or "block," deformation of the absorber body 102. As shown in at least FIG. 4A, when the loading forces (represented by 111A in FIG. 4A) exceed a minimal threshold, the counter faces 105A, 105B may separate and the absorber body 102 may begin to deform. In some embodiments, the counter face 105A may move away from the counter face 105B, as shown in FIG. 4A, but it will be understood that the counter face 105B may move, depending on the orientation of the absorber body 102 and the one or more loading forces.

Figure 4B:
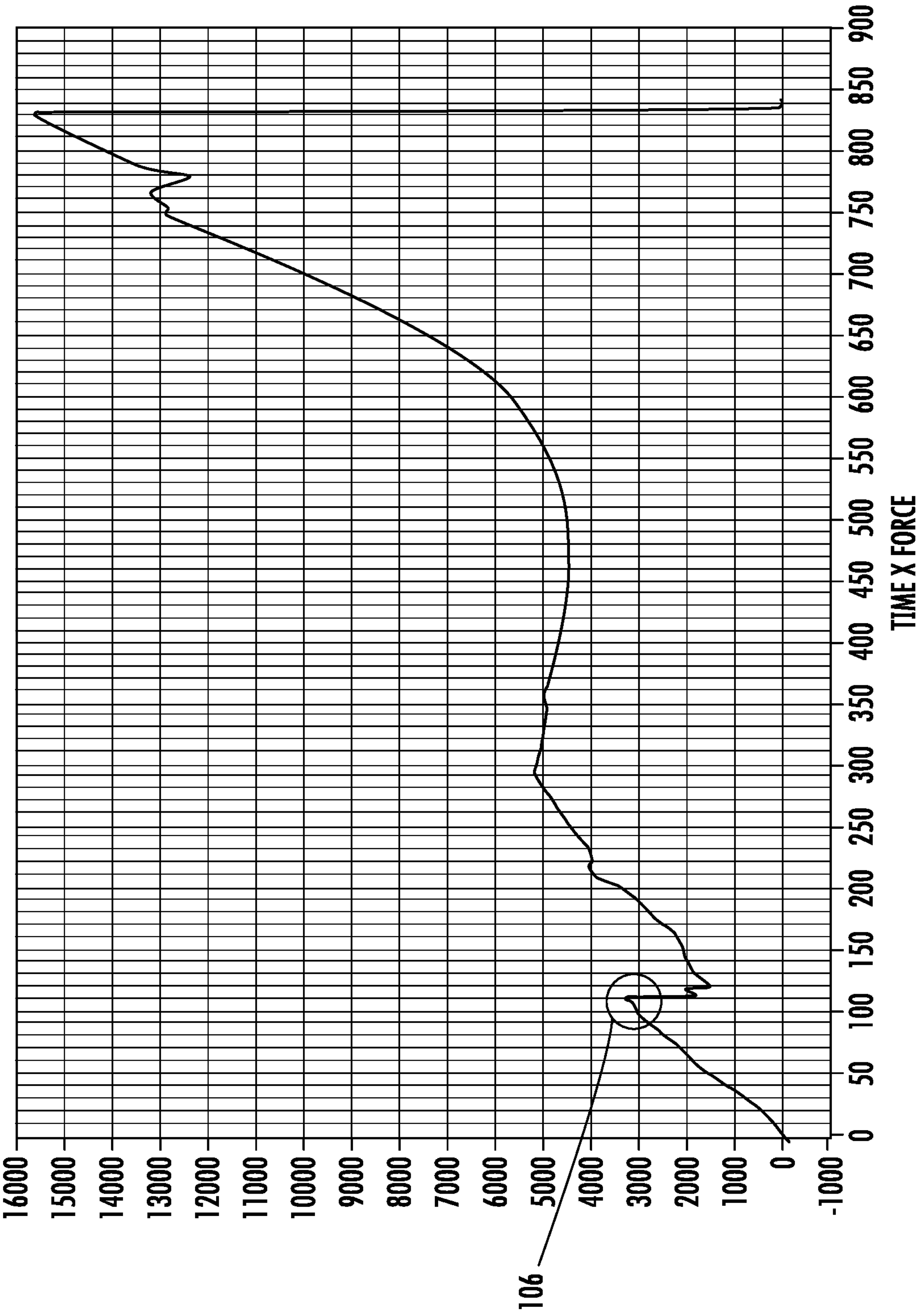
FIG. 4B shows a time-force graph illustrating an example fall protection system undergoing an example load in accordance with various embodiments of the present disclosure.

FIG. 4B shows a graph charting force (in Newtons) on the y-axis and time (in seconds) on the x axis. In some embodiments, and as shown in at least FIG. 4B, the minimal threshold 106 is the amount of loading force at which the load lock 104 may deform. In some embodiments the minimal threshold 106 may be greater than or equal to 2 kilo-Newtons. It will be understood that the minimal threshold 106 may be increased or decreased as desired for the fall protection system 10.

Referring again to FIG. 1B, in some embodiments, the absorber assembly 100 may include a primary absorbing part 108. In some embodiments, the primary absorbing part 108 may be configured not to deform until the one or more loading forces exceed one or more thresholds. The primary absorbing part 108 may be configured to deform only after the load lock 104 deforms (that is, after the counter faces 105A, 105B move away from each other, which occurs after the minimal threshold 106 is exceeded). The primary absorbing part 108 may be a part of the absorber body 102 that is configured to deform prior to other components of the absorber body 102 (e.g., a secondary absorbing part, a tertiary absorbing part, and/or the like), where these other components have higher thresholds, as will be discussed later in this disclosure.

Figure 5A:
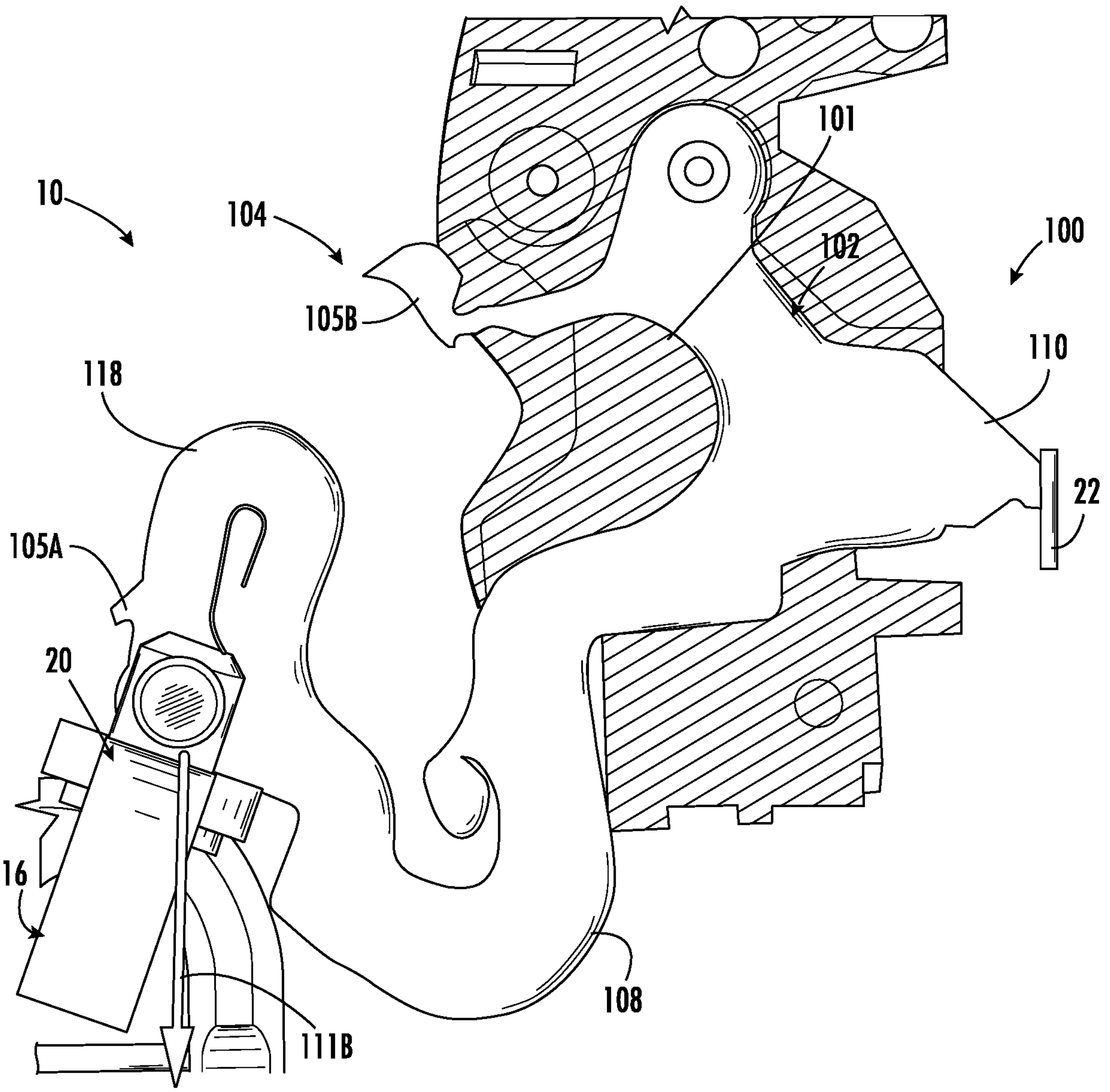
FIG. 5A shows a side, cross-sectional view of an example fall protection system in accordance with various embodiments of the present disclosure.

Referring now to FIG. 5A, the primary absorbing part 108 may be fully deformed after the absorber body 102 undergoes sufficient loading forces (represented by 111B in FIG. 5A) not to exceed a primary threshold 114. This primary threshold 114 is shown in at least FIG. 5B which, similar to FIG. 4B, plots force (in Newtons) on the y-axis and time (in seconds) on the x-axis. As shown, the primary threshold 114 may range between 5.5 kilo-Newtons and 6 kilo-Newtons. In some embodiments, the primary threshold 114 may be 6 kilo-Newtons. It will be understood that, similar to the minimal threshold 106, the primary threshold 114 may be increased or decreased as desired for the fall protection system 10 by making various modifications to the system 10. In some embodiments, the primary absorbing part 108 may be configured to deform the absorber body 102 such that the absorber body 102 doesn't exceed the primary threshold from the one or more loading forces.

Referring again to FIG. 1B, in some embodiments, the absorber assembly 100 may include a secondary absorbing part 118. In some embodiments, the secondary absorbing part 118 may be configured not to deform until the one or more loading forces exceed one or more thresholds. The secondary absorbing part 118 may be configured to deform only after the load lock 104 deforms (that is, after the counter faces 105A, 105B move away from each other, which occurs after the minimal threshold 106 is exceeded) and after the primary absorbing part 106 deforms (that is, after the primary threshold 114 is met or exceeded). The secondary absorbing part 118 may be a part of the absorber body 102 that is configured to deform prior to other components of the absorber body 102 (e.g., a tertiary absorbing part, and/or the like), where these other components have higher thresholds.

Figure 5B:
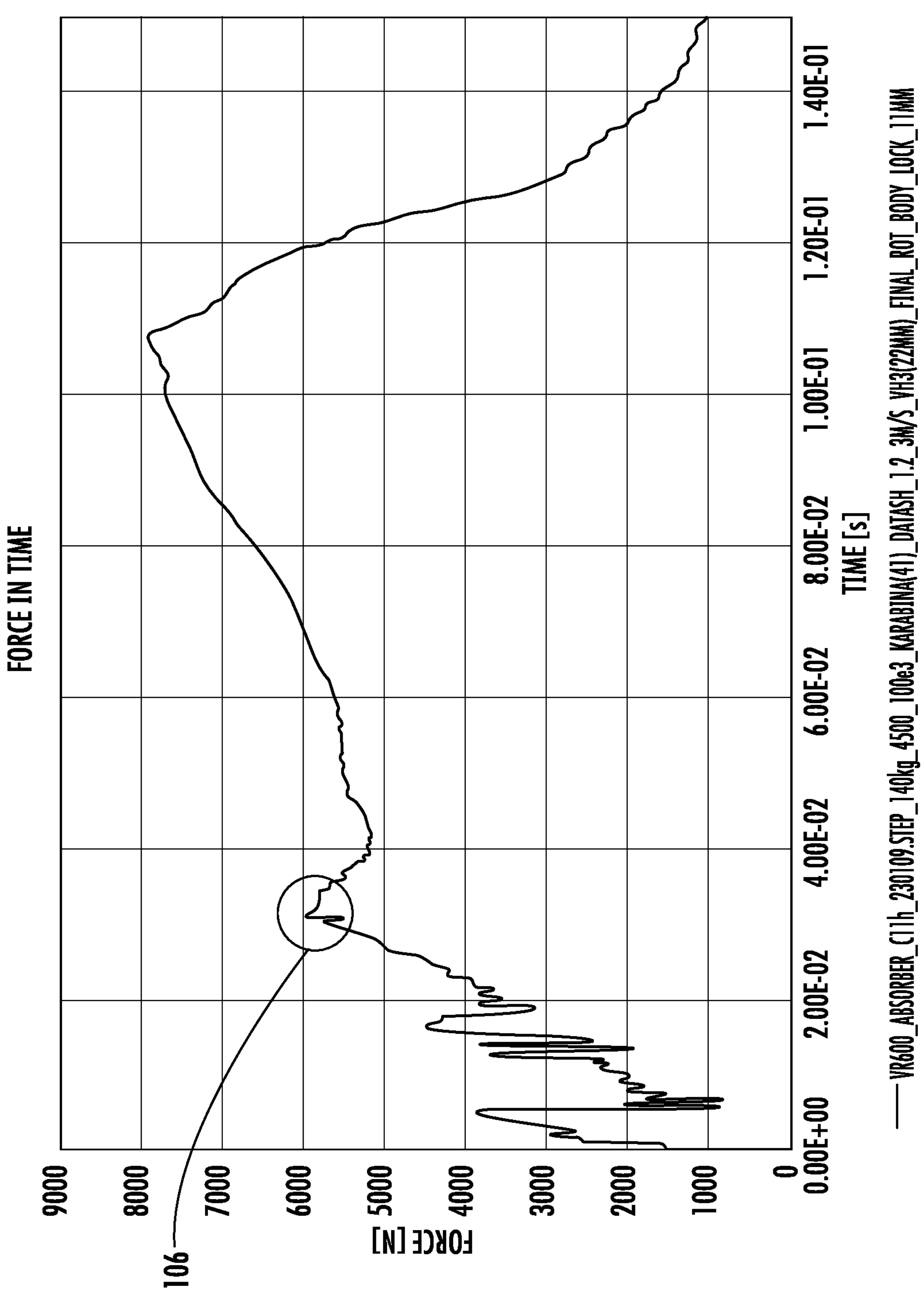
FIG. 5B shows a time-force graph illustrating an example fall protection system undergoing an example load in accordance with various embodiments of the present disclosure.
Figure 6A:
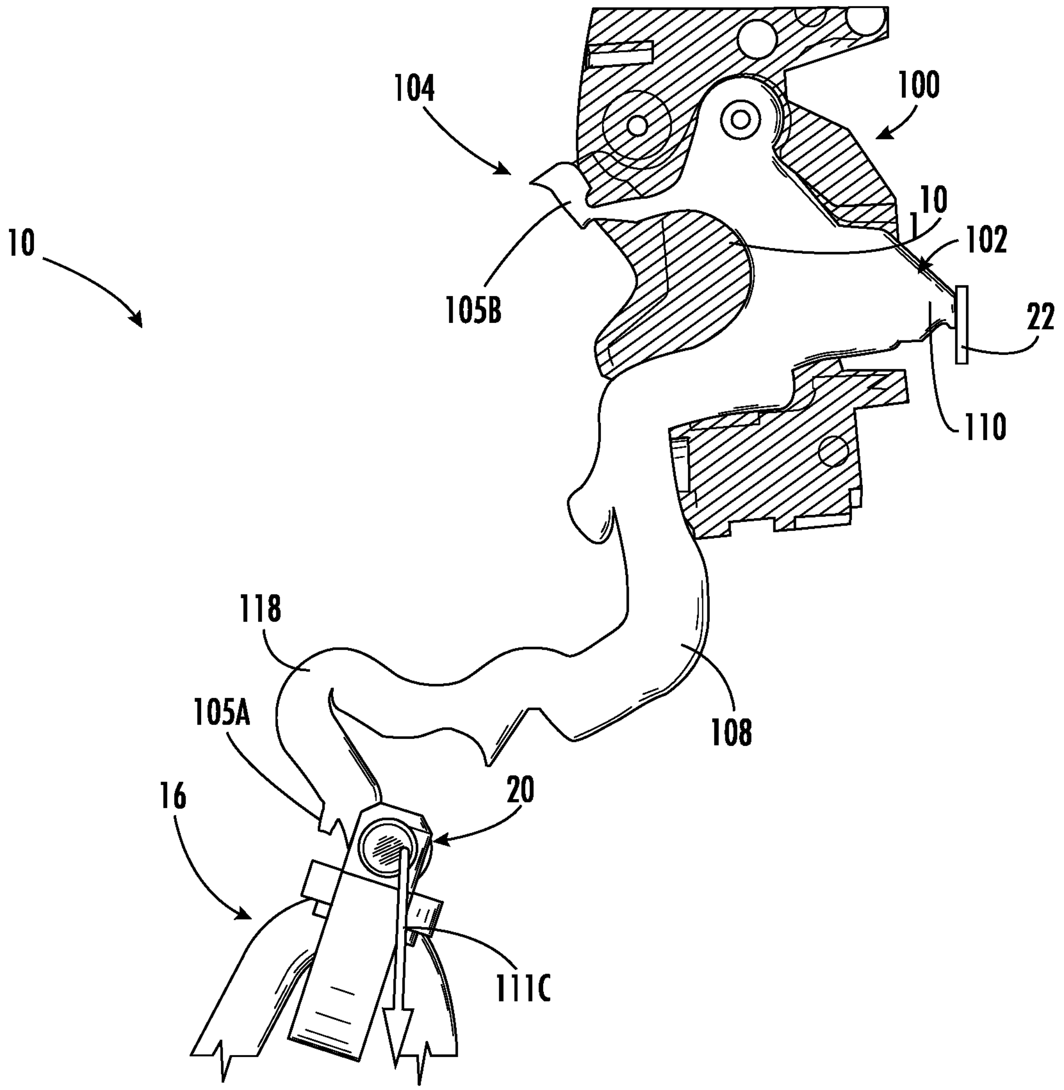
FIG. 6A shows a side, cross-sectional view of an example fall protection system in accordance with various embodiments of the present disclosure.
Figure 6B:
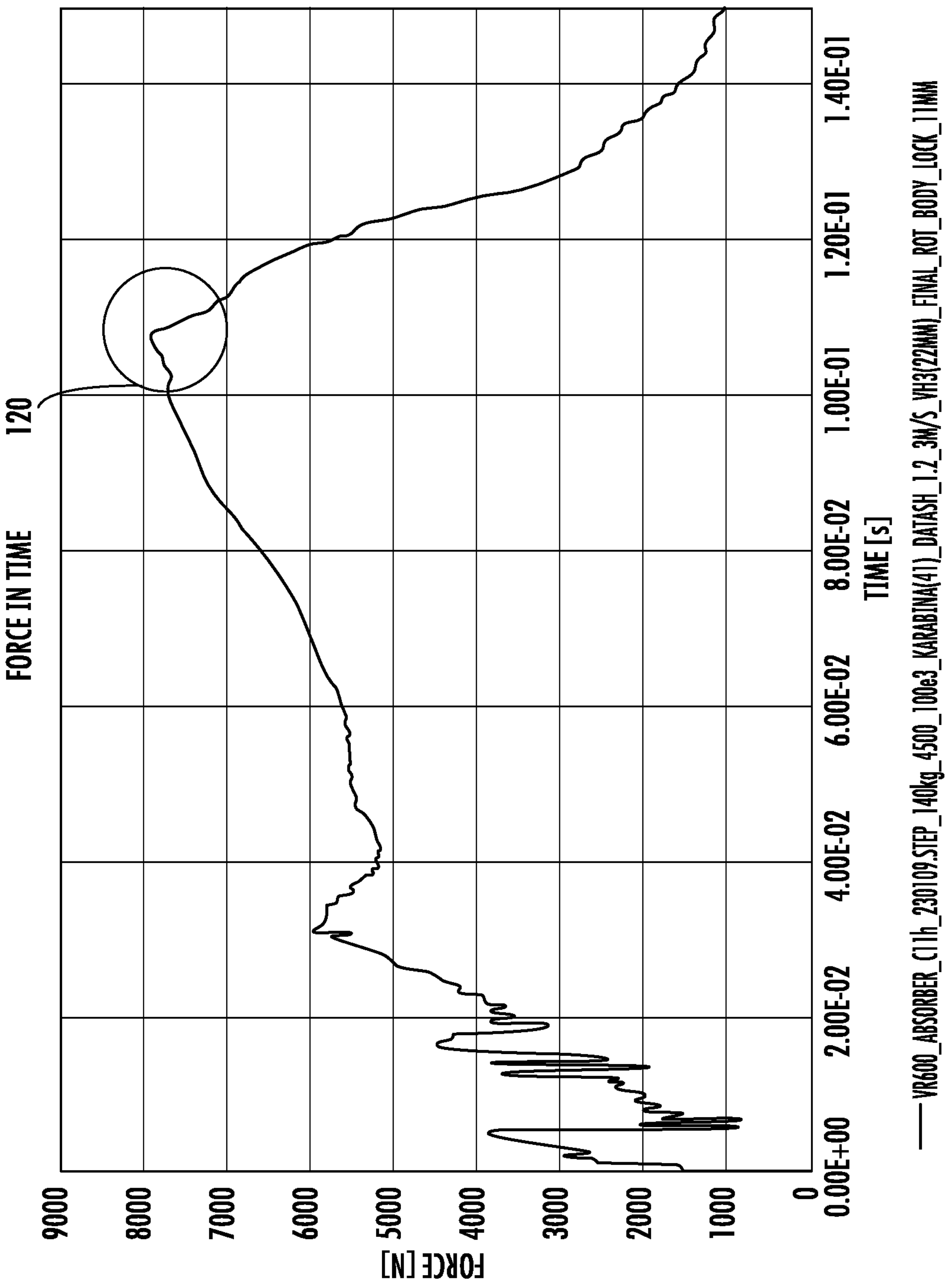
FIG. 6B shows a time-force graph illustrating an example fall protection system in accordance with various embodiments of the present disclosure.

Referring now to FIG. 6A, the secondary absorbing part 118 may be fully deformed after the absorber body 102 undergoes sufficient loading forces (represented by 111C in FIG. 6A) not to exceed a secondary threshold 120. This secondary threshold 120 is shown in at least FIG. 6B which, similar to FIGS. 4B and 5B, plots force (in Newtons) on the y-axis and time (in seconds) on the x-axis. As shown, the secondary threshold 120 may range between 7.5 kilo-Newtons and 8 kilo-Newtons. In some embodiments, the secondary threshold 120 may be 8 kilo-Newtons. It will be understood that similar to the minimal threshold 106 and the primary threshold 114, the secondary threshold 120 may be increased or decreased as desired for the fall protection system 10. In some embodiments, the secondary absorbing part 118 may be configured to deform the absorber body 102 such that the absorber body 102 doesn't exceed the secondary threshold from the one or more loading forces.

Example Methods of Use

Figure 7:
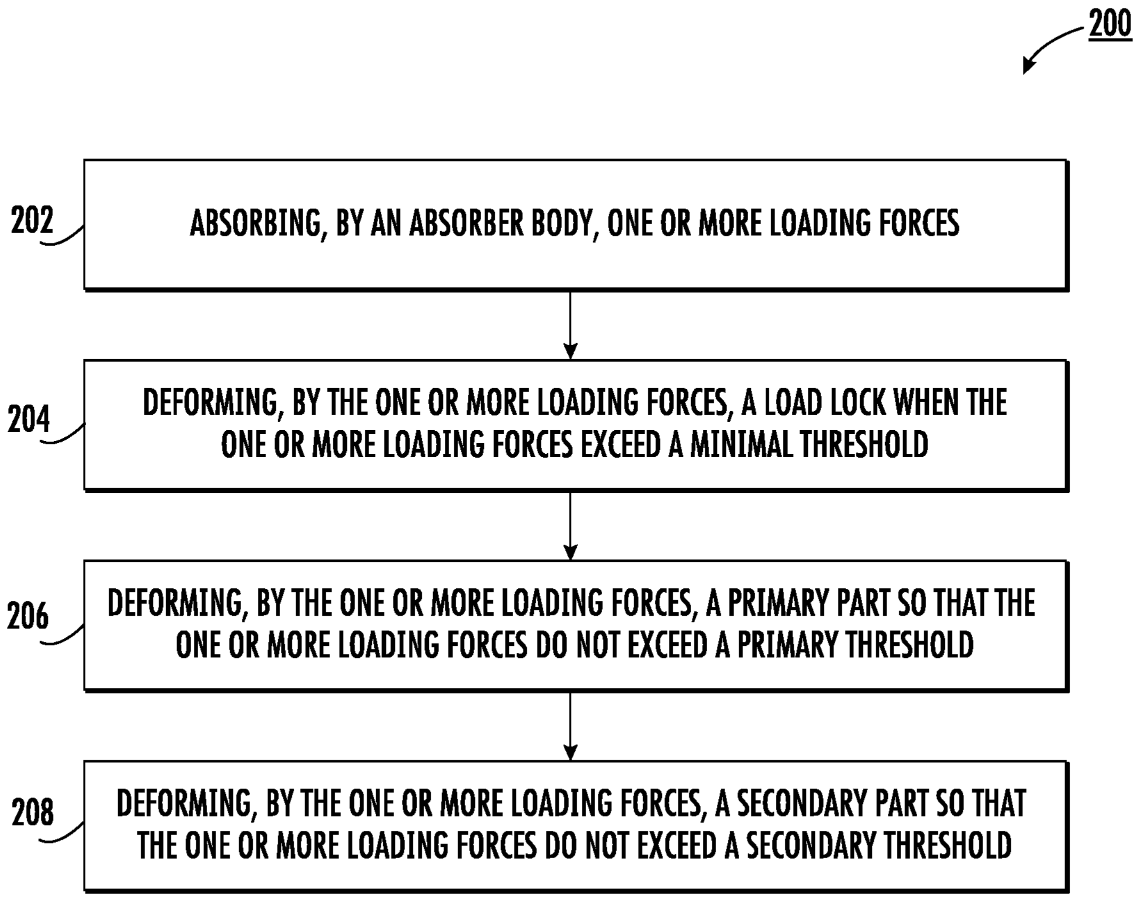
FIG. 7 shows a flow chart illustrating an example method of using an example absorber assembly in accordance with various embodiments of the present disclosure.

According to various embodiments, there is provided a method 200 of using an absorber assembly. The method 200 shown in FIG. 7 is described with respect to the fall protection system 10, the absorber assembly 100, and the various components of the system 10 and assembly 100, as previously described. It will be understood that the method 200 may be performed using a variety of systems, assemblies, and components.

In some embodiments, the method 200 may include a step 202 of absorbing, by an absorber body, one or more loading forces. The loading forces may be caused by a user of the fall protection system slipping or losing their grip on a rail, ladder, etc. that they are using, falling, and subsequently causing the fall protection system to engage.

In some embodiments, the method 200 may include a step 204 of deforming, by the one or more loading forces, a load lock when the one or more loading forces exceed a minimal threshold.

In some embodiments, the method 200 may include a step 206 of deforming, by the one or more loading forces, a primary part so that the one or more loading forces do not exceed a primary threshold.

In some embodiments, the method 200 may include a step 208 of deforming, by the one or more loading forces, a secondary part so that the one or more loading forces do not exceed a secondary threshold.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An absorber assembly comprising:

an absorber body configured to deform under one or more loading forces;

a load lock comprising a first counter face and a second counter face, wherein the load lock prevents deformation of the absorber body when the one or more loading forces are below a minimal threshold, wherein the first counter face and the second counter face interlock with each other to prevent deformation of the absorber body when the one or more loading forces are below the minimal threshold and move away from each other only after the minimal threshold is exceeded, wherein the minimal threshold is greater than or equal to about 2 kilo-Newtons;

a line of deformation ("LOD") disposed on or within the absorber body, wherein the absorber body deforms along the LOD;

a primary absorbing part configured to deform the absorber body such that the absorber body does not exceed a primary threshold, wherein the primary threshold is less than or equal to about 6 kilo-Newtons the primary absorbing part being a first segment along the LOD that deforms only after the first and second counter faces move away from each other to prevent the absorber body from exceeding the primary threshold;

a secondary absorbing part configured to deform the absorber body such that the absorber body does not exceed a secondary threshold, wherein the secondary threshold is less than or equal to about 8 kilo-Newtons, the secondary absorbing part being a second, distinct segment along the LOD that deforms only after the primary segment deforms to prevent the absorber body from exceeding the secondary threshold; and a nose portion configured to operably engage with one or more notches of a rail during deformation of the absorber body.

2. The absorber assembly of claim 1, wherein the LOD comprises one or more radii along which deformation is constrained and wherein the absorber body is configured to deform along the LOD.

3. The absorber assembly of claim 1, further comprising one or more additional cross-sectional areas disposed on or in the absorber body.

4. The absorber assembly of claim 3, further comprising an attachment mechanism attached to the absorber body, and wherein the one or more additional cross-sectional areas cross sections are disposed on or within the absorber body at or near one or more points between the attachment mechanism loop portion and the nose portion.

5. A fall protection system comprising:

an absorber assembly comprising:

an absorber body configured to deform under one or more loading forces;

a load lock comprising a first counter face and a second counter face, wherein the load lock prevents deformation of the absorber body when the one or more loading forces are below a minimal threshold, wherein the first counter face and the second counter face interlock with each other to prevent deformation of the absorber body when the one or more loading forces are below the minimal threshold and move away from each other only after the minimal threshold is exceeded, wherein the minimal threshold is greater than or equal to about 2 kilo-Newtons;

a line of deformation ("LOD") disposed on or within the absorber body, wherein the absorber body deforms along the LOD;

a primary absorbing part configured to deform the absorber body such that the absorber body does not exceed a primary threshold, wherein the primary threshold is less than or equal to about 6 kilo-Newtons, the primary absorbing part being a first segment along the LOD that deforms only after the first and second counter faces move away from each other to prevent the absorber body from exceeding the primary threshold;

a secondary absorbing part configured to deform the absorber body such that the absorber body does not exceed a secondary threshold, wherein the secondary threshold is less than or equal to about 8 kilo-Newtons, the secondary absorbing part being a second, distinct segment along the LOD that deforms only after the primary segment deforms to prevent the absorber body from exceeding the secondary threshold; and a nose portion configured to operably engage with one or more notches of a rail during deformation of the absorber body; and an attachment mechanism fixedly attached to the absorber body and configured to secure a user to the rail.

6. The fall protection system of claim 5, wherein the LOD comprises one or more radii along which deformation is constrained.

7. The fall protection system of claim 6, further comprising one or more additional cross-sectional areas disposed on or in the absorber body.

8. The fall protection system of claim 7, wherein the one or more additional cross-sectional areas cross sections are disposed on or within the absorber body at or near one or more points between the attachment mechanism and the nose portion.

9. The fall protection system of claim 6, further comprising a shuttle configured to operably connect the fall protection system to the rail, the shuttle including one or more wheels configured to slidably translate the shuttle along the rail.

10. The fall protection system of claim 5, wherein the attachment mechanism comprises a carabiner.

* * * * *